United States Patent [19]

Shimokura et al.

[11] Patent Number: 4,596,320
[45] Date of Patent: Jun. 24, 1986

[54] HYDRAULIC DAMPER

[75] Inventors: Akihiro Shimokura, Tokyo; Koichi Maeda; Hideo Nishimura, both of Kanagawa, all of Japan

[73] Assignee: Tokico Ltd., Kanagawa, Japan

[21] Appl. No.: 612,022

[22] Filed: May 18, 1984

[30] Foreign Application Priority Data

May 20, 1983 [JP] Japan ................................. 58-88925

[51] Int. Cl.⁴ .............................................. F16F 9/46
[52] U.S. Cl. .................................... 188/299; 188/319
[58] Field of Search ............... 188/279, 280, 281, 282, 188/299, 315, 319, 322.15; 251/134, 129.12; 137/599

[56] References Cited

U.S. PATENT DOCUMENTS

| 3,206,117 | 9/1965 | Anderson et al. | 251/134 X |
| 4,313,529 | 2/1982 | Kato et al. | 188/299 |
| 4,463,839 | 8/1984 | Ashiba | 188/299 |
| 4,527,676 | 7/1985 | Emura et al. | 188/299 |

Primary Examiner—Bruce H. Stoner, Jr.
Assistant Examiner—Richard R. Diefendorf
Attorney, Agent, or Firm—Wenderoth, Lind & Ponack

[57] ABSTRACT

A hydraulic damper includes a cylinder containing hydraulic fluid therein, a piston working in the cylinder and partitioning the interior thereof into two liquid chambers, a piston rod connected to the piston and extending through one of the liquid chambers to project to the outside of the cylinder, and disc valves provided on opposite sides of the piston for generating damping force both in the extension and contraction strokes of the damper. A liquid passage is formed in the piston rod to communicate the two liquid chambers separately from the disc valves. An adjusting member is provided in the liquid passage and is displaceable between three or more adjusting positions for changing the effective area thereof. A digital encoder connected to the adjusting member for detecting the adjusting positions. The digital encoder includes a common electric line which ON-OFF controls at least two other electric lines when the other two lines generate the same digital signals.

4 Claims, 11 Drawing Figures

1

HYDRAULIC DAMPER

BACKGROUND OF THE INVENTION

This invention relates to a hydraulic damper and, particularly to a hydraulic damper of the adjustable damping force type.

One prior art hydraulic damper of the adjustable damping force type comprises a cylinder containing hydraulic fluid therein, a piston working in the cylinder and partitioning the interior thereof into two liquid chambers, a piston rod connected to the piston and extending through one of the liquid chambers to project to the outside of the cylinder, a liquid passage formed in the piston rod for communicating said two liquid chambers, and an adjusting member for adjusting the effective passage area of the liquid passage. The adjusting member is rotatably disposed in the piston rod to selectively open or close a plurality of radial openings which are provided in the piston rod to constitute a part of the liquid passage. Usually, a sensor is provided to detect the angular position of the adjusting member to generate an electric signal to actuate an indicator which is preferably mounted in an instrument panel of an automobile so that the driver of the automobile can easily observe the adjusted condition of hydraulic dampers.

When a digital encoder is utilized to detect the adjusted positions of the adjusting member, there is a problem that when a digital signal representing an adjusted position of the adjusting member has the same digit (1 or 0) at different columns, it is required that the detection should be performed simultaneously, an otherwise a false signal may be transmitted to an electric circuit connected to the digital encoder and the adjusting member may not sometimes be set to the desired adjusted position.

SUMMARY OF THE INVENTION

The object of the present invention is to solve the problem aforementioned and, according to the invention, there is provided a hydraulic damper including a cylinder containing hydraulic fluid therein, a piston working in the cylinder and partitioning the interior thereof into two liquid chambers, a piston rod connected to the piston and extending through one of the liquid chambers to project to the outside of the cylinder, a liquid passage formed in the piston rod for communicating said two liquid chambers, an adjusting member for adjusting the effective passage area of the liquid passage, and a digital encoder for detecting the adjusting positions of the adjusting member, wherein the digital encoder comprises at least three concentrically arranged electrically conductive arcuate patterns for cooperating respectively with respective sliding elements which are coaxially rotatable relative to the patterns in response to the rotational movement of the adjusting member, and when at least three of the patterns cooperate to generate an electric signal one of the patterns having the smallest angular width in the circumferential direction forms a common electric line against remaining two or more lines.

According to the invention, the digital encoder can generate reliable digital signals and the adjusting member can reliably be adjusted to desired positions.

BRIEF DESCRIPTION OF THE DRAWINGS

These and other objects and advantages of the invention will become apparent from the following explanatory description with reference to the attached drawings exemplifying preferred embodiments of the invention and in which.

DESCRIPTION OF THE PREFERRED EMBODIMENT

Figure 1:
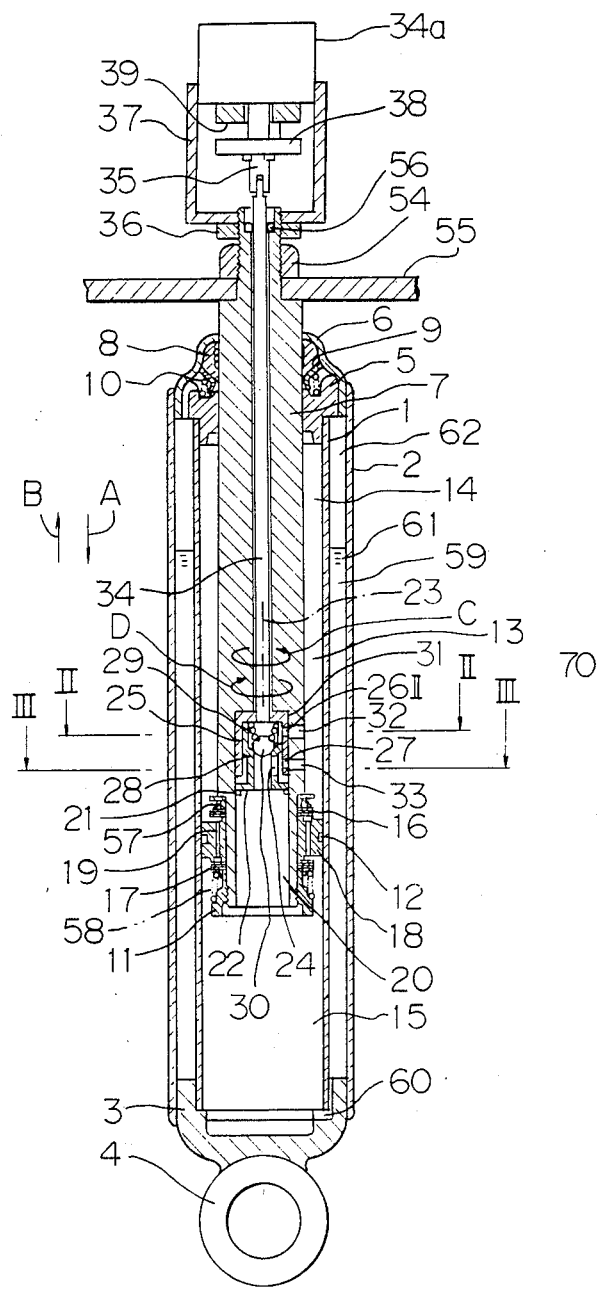
FIG. 1 is a longitudinal sectional view of a hydraulic damper according to the invention.
Figure 2:
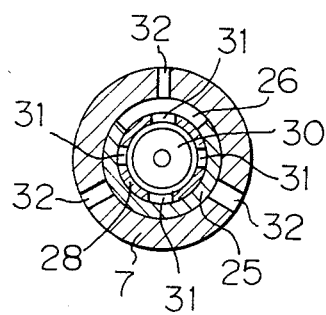
FIG. 2 is a sectional view taken along line II—II in FIG. 1.
Figure 3:
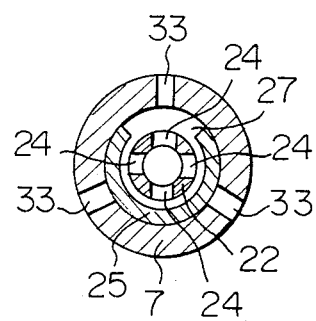
FIG. 3 is a sectional view taken along line III—III in FIG. 1.
Figure 4:
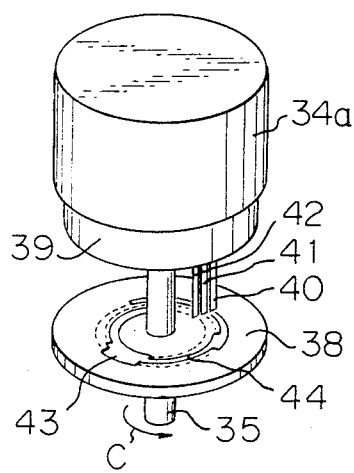
FIG. 4 is an enlarged perspective view of a digital encoder shown in FIG. 1.
Figure 5:
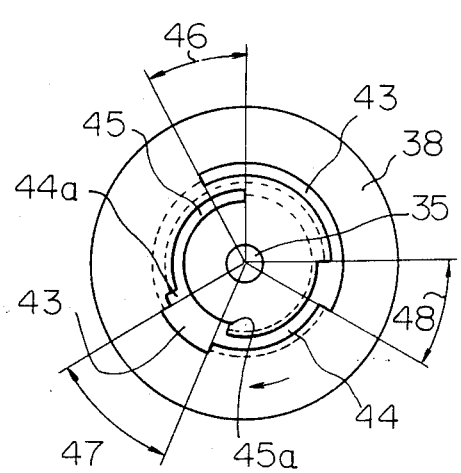
FIG. 5 is a plan view showing a circular plate of the digital encoder of FIG. 4.
Figure 6:
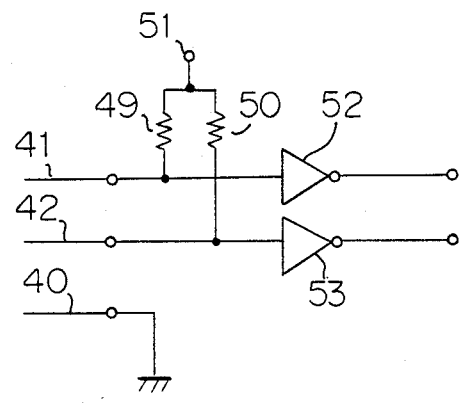
FIG. 6 is an explanatory diagram of a part of an electric circuit.

In the first embodiment shown in FIGS. 1–8, the hydraulic damper is of the so-called dual tube type comprising an inner tube 1 defining a cylinder, a concentric outer tube 2 surrounding first inner tube 1, a cap 3 secured to one ends of the inner and outer tubes 1 and 2, a mounting ring 4 secured to the cap 3, a rod guide 5 and a cap 6 secured to second ends of the inner and outer tubes 1 and 2, and a hollow piston rod 7 extending respectively through the rod guide 5 and the cap 6. A seal 8 is provided on the inner side of the cap 6 and slidably engages with the piston rod 7. An annular seal member 9 having a depending resilient lip is urged against the inner surface of the seal 8 by a spring 10 which is disposed between the seal member 9 and the rod guide 5. The lip normally engages with the rod guide 5 to constitute a check valve the function of which will be explained hereinafter. A piston 12 is mounted on the lower end of the piston rod 7 and is secured thereto by an annular nut 11. The piston 12 partitions the interior 13 of the inner tube 1 into upper and lower liquid chambers 14 and 15. Two sets of axial passages 18 and 19 (only one each of which is shown in FIG. 1) are formed in the piston 12 to cooperate respectively with disc valves 16 and 17 which are provided on opposite surfaces of the piston 12. The disc valve 16 generates a damping force when the piston 12 moves in the direction of arrow A or the contraction stroke of the damper and, the disc valve 17 generates a damping force when the piston 12 moves in the direction of arrow B or the extension stroke of the damper. A tubular member 22 is non-rotatably mounted in a hollow portion 20 of the piston rod 7 by a retaining ring 21, and a plurality of cutout portions 24 are formed in the circumferential wall of the tubular member 22 as shown in FIG. 3. An adjusting member 25 is mounted in the hollow portion 20 to rotate in the directions of arrows C and D. The adjusting member 25 has a generally tubular wall portion having a through hole 26 (FIG. 2) and a cutout 27 (FIG. 3), and a circular disc shaped portion integrally connected to the tubular wall portion. A generally cup shaped valve seat member 28 is disposed between the adjusting member 25 and the tubular member 22 and is secured to the tubular member 22. A valve seat is formed in the bottom wall of the valve seat member 28 and is normally closed by a valve 30 which is urged by a weak spring 29. A plurality of cutouts 31 (FIG. 2) are formed in the circumferential wall of the valve seat member 28. There are provided in the circumferential wall of the piston rod 7 a plurality of a first group of radial holes 32 (FIG. 2) and a second group of radial holes 33 (FIG. 3) to communicate the hollow portion 20 with the upper liquid chamber 14. The radial holes 32 respectively have different diameters and the radial holes 33 have correspondingly different diameters. For rotating the adjusting member 25 in the directions of arrows C and D, the adjusting member 25 shown in the illustated embodiment is secured to a rod 34 which extends coaxially through the piston rod 7 with the upper end thereof projecting to the outside of the piston rod 7. A shaft 35 of an electric motor 34a is secured to the rod 34. The motor 34a is supported on a supporting member 37 which is mounted on the projecting end of the piston rod 7 through a nut 36 or the like. A circular disc 38 is secured to the shaft 35 of the electric motor 34a. A brush supporting member 39 is secured to one end surface of a casing of the electric motor 34a, and three brushes 40, 41 and 42 constituting sliding elements according to the invention are supported on the brush supporting member 39 to slidably contact with the circular disc 38 when the disc 38 rotates in response to the actuation of the electric motor 34a, as shown clearly in FIG. 4. Three electrically conductive patterns 43, 44 and 45 are provided on the surface of the disc 38 for contacting the brushes 40, 41 and 42, respectively. The patterns 43, 44 and 45 have respective arcuate configurations extending along respective concentric circles by predetermined angular extensions, and cooperate respectively with brushes 40, 41 and 42. The patterns 43 and 45 overlap with each other at a zone 46, the patterns 43, 44 and 45 are connected with each other at a zone 47, and the patterns 43 and 44 are connected with each other at a zone 48 as shown in FIG. 5. On the boundary portion of the zone 47 the patterns 44 and 45 have extended portions 44a and 45a according to the invention. The brushes 41 and 42 are respectively connected through resistances 49 and 50 to D.C. electric source 51 and inverters 52 and 53 which generate electric voltage logic signals, and the brush 40 is grounded, as shown in FIG. 6. The zones 46, 47 and 48 respectively correspond to the positions of radial holes 32 and 33. The brushes 40, 41 and 42, and the disc 38 having patterns 43, 44 and 45 constitute the digital encoder according to the invention.

The projecting end of the piston rod 7 is secured to a body member 55 of such as an automobile by a nut 54 and the mounting ring 4 is mounted on such as an axle of a wheel of the automobile. Shown at 56 is a seal such as an O-ring for preventing the leakage of oil, and shown at 57 and 58 are springs acting respectively on the valves 16 an 17. An annular chamber 59 defined between the inner and outer tubes 1 and 2 is communicated with the lower liquid chamber 15 through one or more grooves 60 formed in the inner surface of the cap 3 and with an annular space defined between the rod guide 5 and the seal 8 through one or more cutouts formed in the rod guide 5. The chambers 14 and 15 and the lower portion of the annular chamber are filled with oil or hydraulic fluid 61, and the upper portion of the chamber 59 receives therein gas under pressure 62 such as air or nitrogen. The check valve 9 prevents the gas from entering into the upper chamber 14 and permits the leakage of the fluid from the upper chamber 14 to the annular chamber 59 through the clearance between the rod guide 5 and the piston rod 7.

The operation of the hydraulic damper having the aforesaid constitution will hereinafter be explained.

When the piston 12 moves in the direction of arrow B or in the extension stroke, the valve 30 is closed and the oil in the chamber 14 flows into the chamber 15 by opening the disc valve 17 and through a first passage consisting of one of radial holes 33 in the piston rod 7, cutout 27 in the adjusting member 25, a cutout 24 in the tubular member 22 and the hollow portion 20 in the piston rod 7. The disc valve 17 mainly defines the damping force when the speed of the piston is large, and the effective passage area of the first passage aforementioned mainly defines the rising up or increasing portion of damping force characteristics curve or the damping force in the low speed range of the piston. In this embodiment, the radial holes 33 consist of three different sized holes as shown in FIG. 3, and the damping force Fe in the extension stroke is defined by one of the curves 71, 75 and 79 in FIG. 7.

When the piston moves in the direction of arrow A or in the contraction stroke, the oil in the chamber 15 flows into the chamber 14 by opening the disc valve 16 and through the first passage 20, 24, 27 and 33 and through a second passage consisting of the check valve 30, one cutout 31 in the valve seat member 28, the through hole 26 in the adjusting member 25 and one of the radial holes 32 in the piston rod 7. Similarly to the radial holes 33, the radial holes 32 in this embodiment have three correspondingly different sizes as shown in FIG. 2 which define the effective area of the second passage. The damping force Fc in the contraction stroke is denoted by one of curves 72, 76 and 80 in Fig. 7 according to the angular position of the adjusting member 25.

Figure 7:
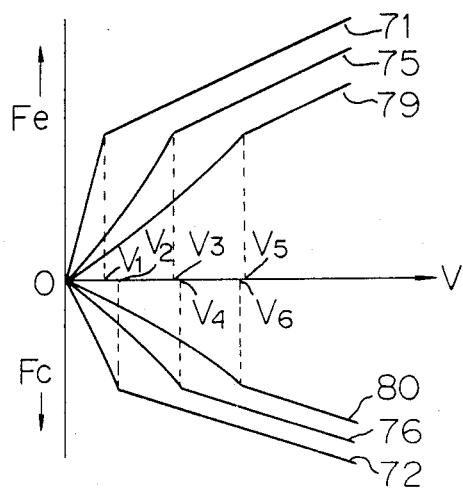
FIG. 7 is a characteristic diagram of the damping force of the hydraulic damper of FIG. 1.

When the driver of a vehicle such as an automobile wishes to select the damping force Fe in the extension stroke and the damping force Fc in the contraction stroke as curves 71 and 72 in FIG. 7 by operating an operating button or an operating knob (not shown) provided on an instrument panel of the vehicle, the motor 34a is energized and the output shaft 35 thereof rotates in the direction of arrow C for example. The rod 34 and the disc 38 rotate also in the same direction, until the adjusting member 25 closes the maximum sized radial holes 32 and 33 and the intermediate sized radial holes 32 and 33 and opens the minimum sized radial holes 32 and 33 (i.e. the minimum sized radial holes 32 and 33 face respectively with the through hole 26 and the cutout 27 in the adjusting member 25). Then, the tip ends of brushes 40, 41 and 42 are positioned in the region 46 and, the brush 42 is electrically connected with the brush 40 through patterns 45, 44 and 43 so that the inverter 53 receives an input of digit "0" and generates an output of digit "1" as shown by a signal 73 in FIG. 8. The brush 41 is electrically disconnected from the brush 40, the inverter 52 generates an output of digit "0" which is denoted as signal 74 in FIG. 8. The signals 73 and 74 are received in an electric processing circuit which acts to stop the rotation of the motor 34a.

Figure 8:
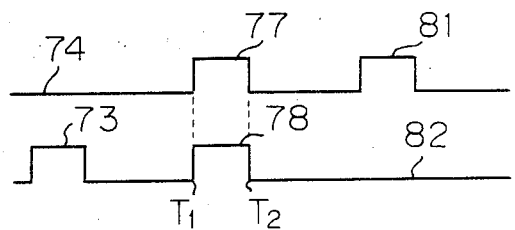
FIG. 8 is a diagram showing the output signal of the electric circuit of FIG. 6.

When the driver of the vehicle wishes to change the damping force characteristics from curves 71 and 72 to curves 75 and 76, the motor 34a is actuated to rotate the shaft 35 in the direction of arrow C until radial holes 32 and 33 of intermediate size are opened, with radial holes 32 and 33 of the maximum and the minimum size being closed by the adjusting member 25. The tip ends of brushes 40, 41 and 42 then are located in the region 47. The brushes 40, 41 and 42 are electrically connected with each other through patterns 43, 44 and 45. The inverters 52 and 53 respectively and simultaneously generate signals of digit "1" as denoted by numerals 77 and 78 in FIG. 8. According to the invention, as shown in FIG. 5, the region 47 is defined solely by the pattern 43 cooperating with the brush 40 which is connected to the ground or a common line as shown in FIG. 6. In other words, the pattern 44 has an excess portion 44a and the pattern 45 has an excess portion 45a in the circumferential direction, so that in regions near to the region 47, the brushes 41 and 42 contact respectively with respective patterns 44 and 45 prior to the contact of the brush 40 with the pattern 43. Accordingly the signals 77 and 78 are generated simultaneously at a time $T_1$ and are diminished simultaneously at time $T_2$ as shown in FIG. 8. The signals 77 and 78 reliably control the angular position of the adjusting member within the region 47.

It will be noted that if signals 77 and 78 are not generated simultaneously, for example, if the signal 78 is generated earlier than the signal 77, then the processing circuit receives the signal as the signal 73, thereby generating a false indication or failure in the adjusting operation.

When the driver of the vehicle wishes to change the damping force characteristics from curves 75 and 76 to curves 79 and 80, the motor 34a is rotated to rotate the adjusting member to the region 48, whereat the through hole 26 and the cutout 27 in the adjusting member 25 face respectively to the radial holes 32 and 33 of the maximum size. The brushes 40, 41 and 42 are located in the region 48, with the brushes 40 and 41 being electrically connected through patterns 43 and 44. The inverters 52 and 53 generate signals 81 and 82 of digit "1" and "0" respectively.

Figure 9:
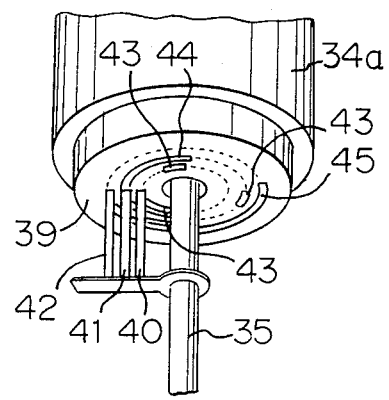
FIG. 9 is a view similar to FIG. 4 but showing a modified form.
Figure 10:
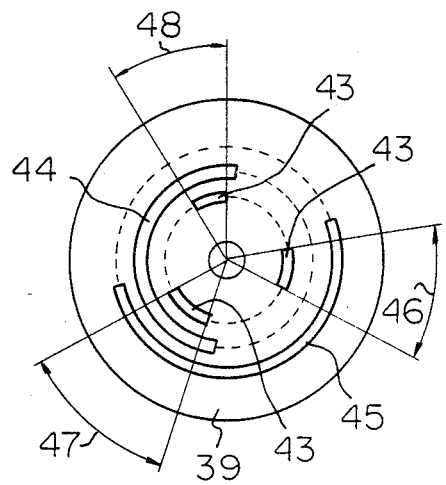
FIG. 10 is a view similar to FIG. 5 but showing the modified form according to FIG. 9.

In this embodiment, the brushes 40, 41 and 42 are mounted on the supporting member 39 and are electrically insulated from each other, and electrically conductive patterns 43, 44 and 45 are formed on the rotating circular plate 38 to electrically connect the brushes 40, 41 and 42, thereby generating output signals for controlling the rotational movement of the adjusting member 25 and generating signals to indicate the adjusted condition. However, the invention is not limited to such arangement. In FIGS. 9 and 10, the brushes 40, 41 and 42 are electrically connected with each other, and are secured to the output shaft 35 of the motor 34a to rotate therewith. The brushes 40, 41 and 42 cooperate respectively with electrically conductive patterns 43, 44 and 45 which are mounted on the stationary supporting member 39 and extend along respective three concentric circles and have predetermined circumferential extensions. In the second embodiment, the pattern 43 is grounded, and patterns 44 and 45 are connected respectively to the input side of the inverter 52 and resistance 49 and to the input side of the inverter 53 and resistance 50 to constitute a circuit similar to the first embodiment shown in FIG. 6. In the second embodiment, the circumferential extensions of the pattern 43 define respective regions 46, 47 and 48, while, in the first embodiment, the region 47 is defined by the circumferential extension of the pattern 43, but the regions 46 and 48 are defined by the circumferential extensions of the patterns 43 and 45 and by the circumferential extensions of patterns 44 and 43 respectively.

Figure 11:
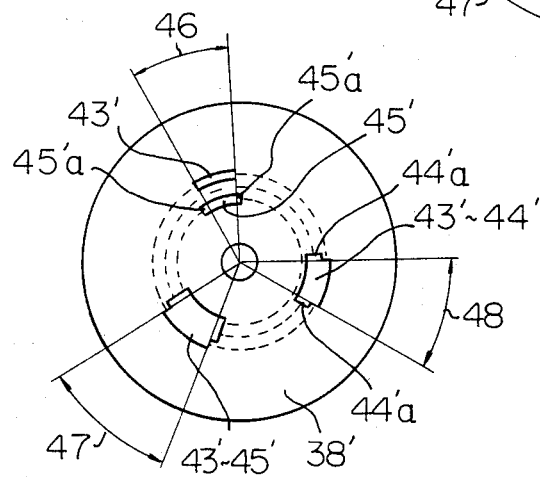
FIG. 11 is a view similar to FIG. 5 but showing a further modified form.

FIG. 11 shows a further modified form wherein the region 46 is defined by the circumferential extension of the pattern 43' and a pattern 45' having excess portions 45'a on opposite ends of the region 46 is electrically connected to the pattern 43'.

The above description has been made with respect to digital encoders generating digital signals of two columns. However, the digital encoder according to the invention may generate digital signals of three or more columns when it is desired to adjust the damping force between four or more adjusted positions of the adjusting member. Further, the common line need not necessarily be grounded and may be connected directly to an electric source such as 51 thereby generating directly signals 73, 74 and the like, with inverters 52 and 53 being omitted.

As described heretofore, according to the invention, the damping force characteristics of the hydraulic damper are adjusted by angular positions of an adjusting member, and the angular positions are detected and controlled by a digital encoder having at least one common line which is connected to either one of the electric source and the ground, wherein ON-OFF control of at least two other lines is performed by ON-OFF controlling the common line particularly when the other lines produce the same digital signal. Thus, it is possible to prevent false detecting signals and to improve the reliability of adjustment.

What is claimed is:

1. In a hydraulic damper including a cylinder containing hydraulic fluid therein, a piston working in the cylinder and partitioning the interior thereof into two liquid chambers, a piston rod connected to the piston and extending through one of the liquid chambers to project to the outside of the cylinder, disc valves provided on opposite sides of the piston for generating damping force both in the extension and contraction strokes of the damper, a liquid passage formed in the piston rod for communicating said two liquid chambers, an adjusting member for adjusting the effective passage area of the liquid passage, and a digital encoder for detecting the adjusting positions of the adjusting member, the improvement wherein said digital encoder comprises:

at least three concentrically arranged electrically conductive patterns;

at least three sliding elements mounted for, upon relative rotation between said patterns and said sliding elements, electrically contacting respective said patterns;

said patterns having circumferential dimensions such that a first said pattern contacts its respective sliding element in a first circumferential region whereat a second said pattern contacts its respective sliding element, thereby generating a first digital signal representative of a first position of said adjusting member, a second circumferentail region whereat a third said pattern contacts its respective sliding element, thereby generating a second digital signal representative of a second position of said adjusting member, and a third circumferential region whereat both said second and third patterns contact their respective sliding elements, thereby generating third and fourth digital signals representative of a third position of said adjusting member;

said first pattern being connected to a common electric line; and said second and third patterns extending in respective opposite circumferential directions beyond said first pattern on opposite circumferential sides of said third circumferential region, thereby ensuring simultaneous generation of said third and fourth digital signals.

2. The improvement claimed in claim 1, wherein said adjusting member is rotatable together with said adjusting member.

3. The improvement claimed in claim 1, wherein said adjusting member is rotatably disposed in said piston rod and said patterns are mounted on a stationary member to cooperate with said sliding elements which are rotatable together with said adjusting member.

4. The improvement claimed in claim 1, wherein said common electric line comprises a ground connection.

* * * * *